(12) United States Patent
Lefebvre et al.

(10) Patent No.: US 7,654,093 B2
(45) Date of Patent: Feb. 2, 2010

(54) METHOD OF ADJUSTING A TRIGGERING CLEARANCE AND A TRIGGER

(75) Inventors: Guy Lefebvre, St-Bruno (CA); John Walter Pietrobon, Outremont (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 599 days.

(21) Appl. No.: 11/234,180

(22) Filed: Sep. 26, 2005

(65) Prior Publication Data

US 2007/0256404 A1    Nov. 8, 2007

(51) Int. Cl.
*F02C 7/00* (2006.01)
(52) U.S. Cl. ...................... 60/779; 60/39.091
(58) Field of Classification Search ............ 60/772, 60/779, 39.091, 39.13, 39.281; 415/14
See application file for complete search history.

(56) References Cited

U.S. PATENT DOCUMENTS

| 2,930,188 | A | | 3/1960 | Haworth et al. |
| 2,930,189 | A | | 3/1960 | Petrie |
| 2,977,931 | A | | 4/1961 | Schott |
| 3,034,296 | A | * | 5/1962 | Colley et al. .................. 60/229 |
| 3,050,939 | A | | 8/1962 | Morley |
| 3,159,166 | A | | 12/1964 | Luedemann et al. |
| 3,164,368 | A | | 1/1965 | Klein |
| 3,207,473 | A | | 9/1965 | Madden |
| 3,220,244 | A | | 11/1965 | Donnelly |
| 3,591,308 | A | | 7/1971 | Blattner |
| 3,612,710 | A | | 10/1971 | Mount |
| 3,924,961 | A | | 12/1975 | Hess et al. |
| 4,144,421 | A | | 3/1979 | Sakai |
| 4,773,487 | A | | 9/1988 | Ringer |
| 4,943,013 | A | * | 7/1990 | Kapala et al. ................. 244/54 |
| 5,674,034 | A | * | 10/1997 | Bennett ...................... 411/197 |
| 5,953,901 | A | | 9/1999 | Sidiropoulos |
| 6,607,349 | B2 | | 8/2003 | Mulera et al. |
| 7,207,768 | B2 | * | 4/2007 | Gordon et al. .............. 415/118 |
| 2003/0091430 | A1 | | 5/2003 | Mulera et al. |

\* cited by examiner

*Primary Examiner*—Michael Cuff
*Assistant Examiner*—Andrew Nguyen
(74) *Attorney, Agent, or Firm*—Ogilvy Renault

(57) ABSTRACT

A method of adjusting a triggering clearance and a trigger wherein the triggering clearance can be readily adjusted directly on the assembly line by selectively fixing an axial adjustive position between first and second triggering members.

20 Claims, 3 Drawing Sheets

METHOD OF ADJUSTING A TRIGGERING CLEARANCE AND A TRIGGER

BACKGROUND OF THE INVENTION

1. Field of the Invention

The invention relates generally to a trigger and method for adjusting a triggering clearance suited for use in fuel shut-off mechanisms of gas turbine engines.

2. Description of the Prior Art

In gas turbine engine assembly, it is not always possible to premachine every part to the exact right dimension prior to assembly because, in some cases, the accuracy required is within the range of the tolerance stack-up on the engine. Thus, the exact dimension can only be ascertained once a group of engine parts come together during assembly. This is problematic as time is wasted in assembly having to disassemble parts in order to accurately machine a particular part to the exact required dimension.

In one particular case, the trigger of the fuel shut-off mechanism needs to be positioned in spaced relation with other engine components to define a triggering clearance that must be very accurately controlled. The accuracy required is often within the range of the tolerance stack-up on the engine, and therefore the trigger must undergo a custom grinding operation during assembly to obtain the required triggering clearance. As the trigger must be very accurately machined, it is not uncommon for grinding error to occur thus further delaying engine assembly. Customization and rework add unwanted cost and time to assembly Accordingly, there is a desire to provide a method of adjusting a triggering clearance between engine components to reduce wasted time and effort in assembly.

SUMMARY OF THE INVENTION

It is therefore an aim of the present invention to provide a method of adjusting a triggering clearance for promoting short time engine assembly.

It is also an aim of the present invention to provide a trigger for adjusting a triggering clearance on the assembly line.

Therefore, in accordance with an aspect of the present invention provided is a method of adjusting a triggering clearance comprising the steps of mounting a trigger having first and second engaged members for axial displacement when triggered, and adjusting the triggering clearance by selectively fixing an axial adjustive position between the first and second members.

In accordance with another aspect of the present invention is provided a method of adjusting a triggering clearance in a turbine engine between a fuel shut-off mechanism and an engine part comprising the steps of mounting a trigger of the fuel shut-off mechanism for axial displacement by a ruptured engine part, and adjusting the triggering clearance by selectively fixing a first member of the trigger in an axial adjustive position relative to a second member of the trigger.

In accordance with a further aspect of the present invention is provided a triggering assembly allowing for the adjustment of a triggering clearance directly on an assembly line, the triggering assembly comprising a trigger axially movable under a predetermined pressure, said trigger having a first member securely engageable in a relative adjustive axial position to a second member, an adjustment of the relative adjustive axial position varying the triggering clearance.

In accordance with yet another aspect of the present invention is provided a gas turbine engine safety fuel shut-off mechanism for actuating a fuel control unit to stop a flow of fuel in the event of a rotor shaft rupture, the mechanism comprising a trigger spaced from a rotor by a triggering clearance, the trigger having first and second members engaged in a relative axial position, the relative axial position between the first and second members being adjustable to adjust the triggering clearance, the trigger being axially displaceable when triggered by the rotor to actuate the fuel control unit.

Further details of these and other aspects of the present invention will be apparent from the detailed description and figures included below.

BRIEF DESCRIPTION OF THE DRAWINGS

Reference will now be made to the accompanying drawings, showing by way of illustration a preferred embodiment thereof, and in which.

DESCRIPTION OF THE PREFERRED EMBODIMENTS

Figure 1:
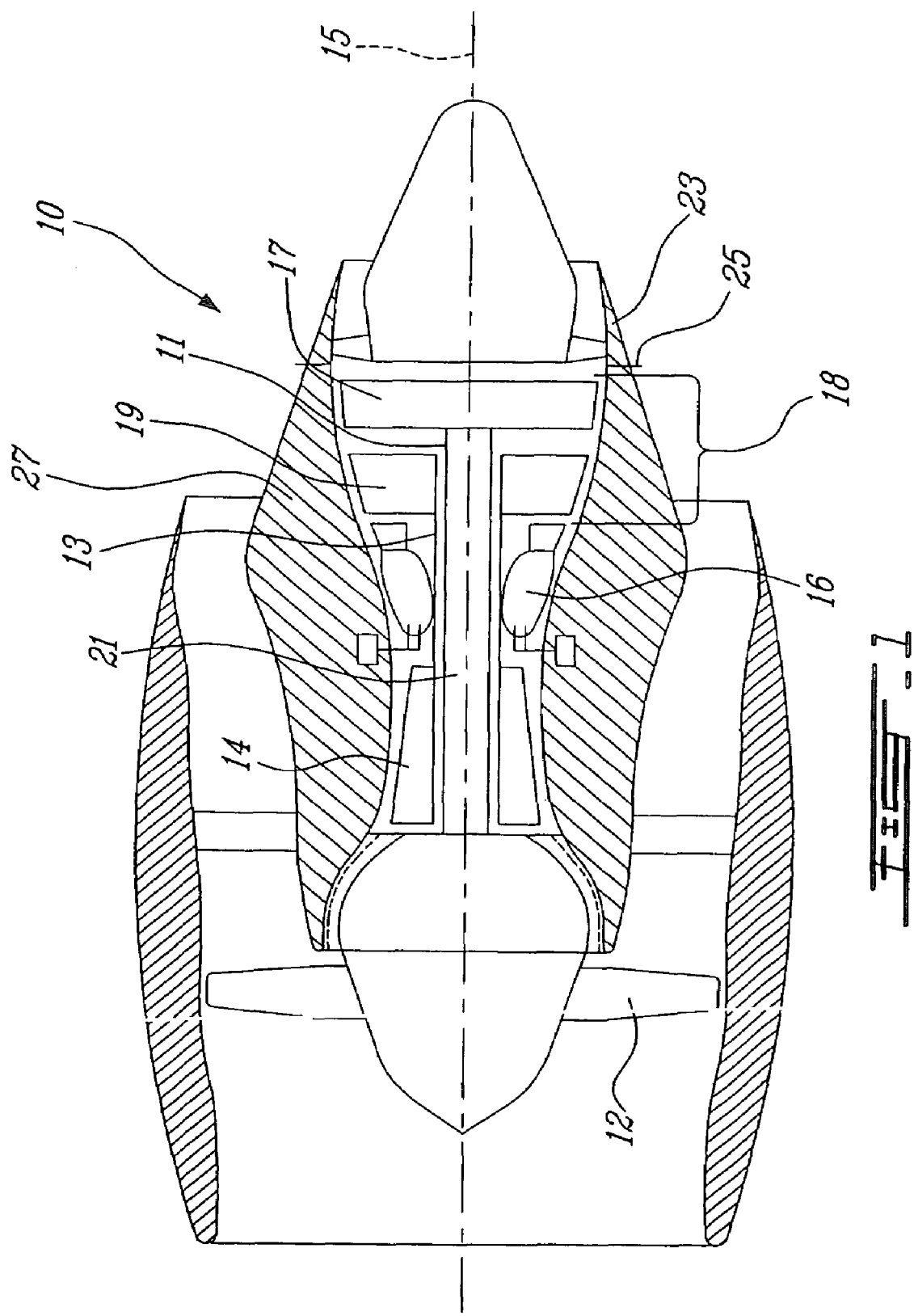
FIG. 1 is a schematic cross-sectional view of a gas turbine engine.

FIG. 1 illustrates a twin-spool turbofan engine 10 of a type preferably provided for use in subsonic flight, generally comprising in serial flow communication a fan 12 (or low pressure compressor) through which ambient air is propelled, a high pressure compressor 14 for further pressurizing the air, a combustor 16 in which the compressed air is mixed with fuel and ignited for generating an annular stream of hot combustion gases, and a turbine section 18 for extracting energy from the combustion gases. Preferably, engine 10 includes a turbine exhaust case (TEC) 23 according to the applicants copending application Ser. No. 10/892,297, filed Jul. 16, 2004, herewith incorporated by reference. The TEC 23 is bolted by a flange 25 integrated at the front end thereof to the engine case 27.

The turbine section 18 comprises a low pressure turbine 17 having at least one last downstream rotor stage including a turbine rotor securely mounted on a turbine shaft 21 drivingly connected to the fan 12 to form the low pressure spool of the engine 10. The turbine section 18 further includes a high pressure turbine 19 drivingly connected to the high pressure compressor 14 via a tubular shaft 13 concentrically mounted about the shaft 21. The high pressure compressor 14, the high pressure turbine 19 and its shaft 13 form the high pressure spool of the engine 10. The low spool and the high spool are independently rotatable with respect to one another.

One way in which the gas turbine 10 can fail is that the low pressure (LP) shaft 21 may shear; thereby disconnecting the LP turbine disc from the rest of the shaft. The low pressure turbine 17 can no longer drive rotation of the low pressure compressor 12 once the LP shaft 21 is sheared, thus the latter will slow down and the former will speed up out-of-control. The speed of the LP shaft 21 is measured by a probe, to monitor the overall speed of the turbine engine 10, and in part to use this information to control fuel flow. One of the problems associated with a broken LP shaft 21 is that the probe detects the LP compressor 12 slowing down and consequently tries to correct the decrease in speed by signalling the fuel control unit to increasing fuel flow. Since fuel to the combustor 16 drives the high pressure (HP) shaft 13, the increase in fuel flow causes the HP shaft 13 rotation to speed up to non-typical speeds. As the LP shaft speed continues to decrease, fuel flow continues to increase in the attempt to correct the problem; and thus, the HP shaft speed increases until the HP disc simply flies apart. In addition, with the LP shaft 21 broken, the LP turbine 17 will also speed up out-of-control until the LP disc simply flies apart.

During an LP shaft shear event, the fuel flow must be shut-off. This is achieved by a fuel shut-off mechanism 20, partly shown in FIG. 2, located axially downstream of the LP shaft 21. More specifically the fuel shut-off mechanism 20 is assembled to the LP shaft rear bearing housing 22 such that it is positioned behind a LP shaft bolt 24 locking bearing 26 in place.

Once the LP shaft 21 is sheared, the LP disc tends to move rearwardly due to pressure effects. The fuel shut-off mechanism 20 located behind the LP shaft bolt 24 is engaged by the rearward movement of the LP disc, thereby in turn triggering the fuel control unit (not shown) to shut-off the fuel. Since HP and LP disc run away occurs quickly, the clearance between the shut-off mechanism 20 and the bolt 24 must be as small as possible, but not too small. A too small clearance is problematic as the fuel shut-off mechanism 20 may be accidentally tripped during a dynamic event such as bird or ice ingestion in which the LP shaft may bend and move around a bit, but not break.

Figure 2:
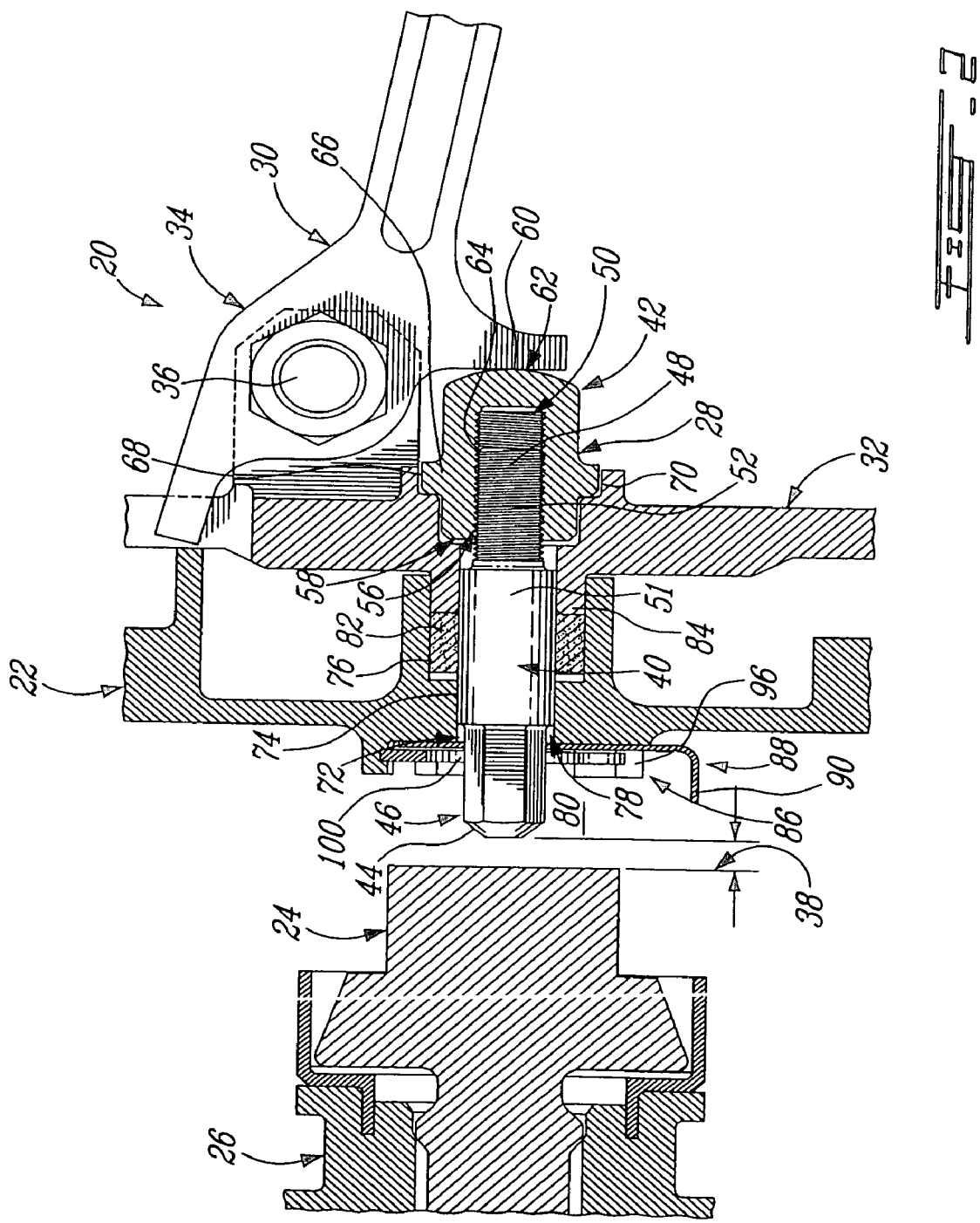
FIG. 2 is an axial cross-sectional view of a trigger of a fuel shut-off mechanism of the gas turbine engine of FIG. 1, in accordance with a preferred embodiment of the present invention.

As shown in FIG. 2, the fuel shut-off mechanism 20 comprises a trigger 28 adapted to act on a safety fuel shut-off lever 30 pivotally mounted on a support 32. The lever 30 is connected to the fuel control unit via a cable assembly (not shown). More specifically, the trigger 28 is loosely housed by the support 32 for axial movement with respect thereto.

When in the assembled position, the trigger 28 is in close proximity to the LP shaft bearing 26 and bolt 24, such that when the LP shaft 21 moves rearwardly, the bolt 24 makes contact with the trigger 28, thereby activating the fuel shut-off mechanism 20. The trigger 28 acts on an upstream end 34 of the lever 30 while the cable assembly (not shown) is connected to an opposite downstream end of the lever 30 (not shown). The upstream end 34 of the lever 30 is mounted on a pivot 36. Upon triggering of the trigger 28 by the LP shaft bolt 24, the latter moves axially causing the lever 30 to pivot upwardly about pivot 36 to shut-off the fuel control unit via the cable assembly (not shown).

FIG. 2 depicts a preferred embodiment of the trigger 28 suited for use in the fuel shut-off mechanism 20 to manually adjust a triggering clearance 38. The trigger 28 for adjusting the triggering clearance 38 has an adjustable length and comprises a first member that can be provided as a pin 40, fixed in a relative axial position to a second member that can be provided as a sleeve 42, such that the relative axial position there between is adjustable. When the trigger 28 is mounted in position proximal to the bolt 24, adjusting the relative axial position between the first and second members adjusts the triggering clearance 38. The trigger 28 is adapted to be axially displaced when triggered by the ruptured LP shaft 21.

Preferably, the pin 40 and sleeve 42 are threadedly engaged and the axial position is adjustable. The pin 40 has a preferably hexagonal head 44 at an upstream end 46 thereof, a threaded portion 48 at a downstream end 50 thereof and a central cylindrical portion 51 inbetween. Preferably the threaded portion 48 has a slightly smaller diameter than the central portion 72. The threaded portion 48 includes external threads 52 disposed on the exterior surface of the pin 40. The sleeve 42 can be provided in the form of a cap having an axial opening 56 defined at an upstream end 58 thereof and an abutting or capping surface 60 defined at a closed downstream end 62 thereof. The capping configuration is preferred since it provides thread protection. The abutting surface 60 is adapted to contact the lever 30 for actuation thereof when the trigger 28 is triggered. The opening 56 extends axially a majority of the length of the sleeve 42 and includes internal threads 64 for mating with the external threads 52 of the pin 40. Thus, the pin 40 is threaded into the internally threaded sleeve 42 such that the threaded portion 48 of the pin 40 is received in the opening 56 of the sleeve 42. As the pin 40 can be screwed and unscrewed relative to the sleeve 42, the relative axial position between the two members is adjustive. Screwing the pin 40 causes an increase in the number of external threads 52 mating with internal threads 64 thereby shortening the distance from the head 44 of the pin 40 to the abutting surface 60 of the sleeve 42. Unscrewing the pin 40 causes the opposite effect. Therefore, the overall length of the trigger 28 is determined by the relative axial position between the pin 40 and the sleeve 42.

Still referring to FIG. 2, it can be seen that the sleeve 42 has a flange 66 extending radially outwards for engagement with the support 32 when in the assembled position. The support 32 is configured to mate with the flange 66 to prevent rotational movement of the sleeve 42. Hence, the sleeve 42 is prevented from rotating when the pin 40 is screwed or unscrewed. The flange 66 is preferably rectangular with a pair of straight sides 68 that abut corresponding straight surfaces 70 of the support 32 for preventing rotation of the sleeve 42. Notably, the support 32 does not prevent the sleeve 42 from sliding axially as the sleeve 42 is only loosely fitted in a corresponding recess defined in the support 32. However, the support does limit the freedom of motion of the sleeve 42 in the forward axial direction by virtue of the engagement of flange 66 with the corresponding inner shoulder of the support 32 (see FIG. 2).

FIG. 2 shows the trigger 28 mounted to the bearing housing 22. More specifically, the bearing housing 22 defines an axial bore 72 with first and second diameter portion 74 and 76 respectively for receiving the pin 40 of the trigger 28. The first diameter portion 74 has substantially the same diameter as the central portion 51 of the pin 40 for ensuring a tight fit while the second diameter portion 76, aft of the first, is larger in diameter. The trigger 28, supported by the support 32, is mounted to the bearing housing 22 by inserting the pin 40 through the axial bore 72 from within the bearing housing such that the head 44 protrudes forwardly from an upstream opening 78 thereof. The central portion 51 of the pin 40 extends through both the first and second diameter portion 74 and 76, fitting snugly through the first diameter portion 74.

As the head 44 of the pin 40 extends into a cavity 80 of the bearing housing 22 filled with lubricating oil, it is advantageous to create a seal. Firstly, by the loose fit between the first diameter portion 74 and the central portion 51 and secondly by the incorporation of a packer seal 82 about the central portion 51 of the pin 40 compressed in the second diameter portion 76.

The bearing housing 22 and support 32 also engage when assembled together to better seal the axial bore 72 as well as to provide greater structural rigidity. The support 32 has a forwardly extending cylindrical piece 84 for axial insertion into the second diameter portion 76 of the bearing housing 22. The cylindrical portion 80 is adapted to fit between the central portion 51 and the second diameter portion 76 adjacent the packer seal 82. Depending on the relative axial position between the pin 40 and the sleeve 42, the cylindrical piece 84 of the support 32 may apply an axial pressure against the packer seal 82 bettering the seal.

Figure 3:
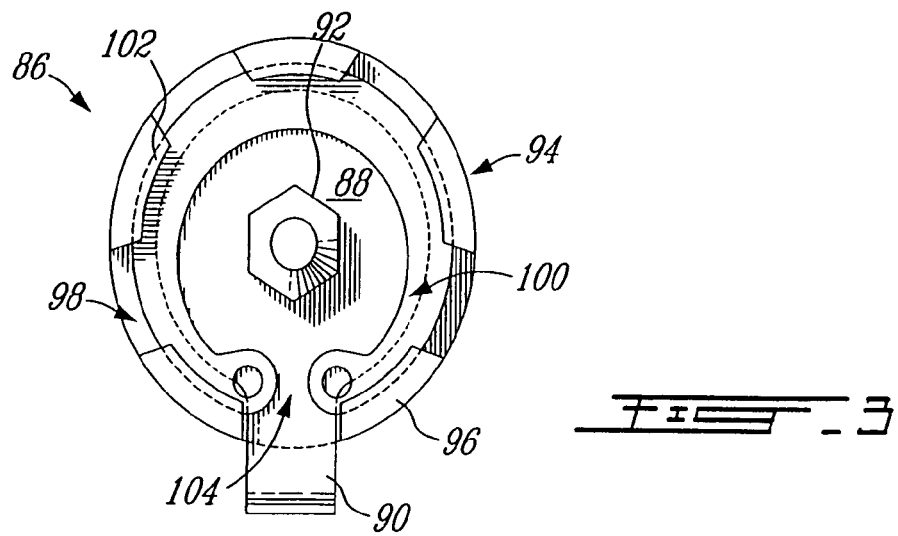
FIG. 3 is a front view of a locking plate and retaining clip for limiting the freedom of motion of the trigger shown in FIG. 2.

Furthermore, the trigger 28 comprises locking means 86 for securing the relative adjustive axial position between the pin 40 and the sleeve 42 once the desired gap 38. Thus, once the triggering clearance 38 has been regulated through the adjustment of the trigger 28, it is necessary to fix the relative axial position between the pin 40 and the sleeve 42. It should be understood that securely fixing the pin 40 and the sleeve 42 together can be achieve in a variety of ways. For instance, the locking means 86 can comprise a locking plate 88 mounted at the upstream opening 78 of the axial bore 72 as depicted in FIGS. 2 and 3. The locking plate 88 is preferably circular with an L-shaped tongue 90 extending both radially and axially. The locking plate 88 defines a central hexagonal aperture 92 for receiving the hexagonal head 44 of the pin 40 therethrough.

Notably, the pin head 44 and the shape of the aperture 92 can be any appropriate shape so long as both parts remain functional, that is, the pin can be screwed at the head 44 and the locking plate 88 can prevent the pin 40 from rotating once in place. The head 44 of the pin 40 is preferably hexagonal to facilitate screwing thereof by a tool passing axially through the bearing 26 into the cavity 80 of the bearing housing 22. Also, the axially extending portion of the tongue 90 facilitates manipulation of the locking plate 88 by way of a tool positioned through the bearing housing 22 as aforementioned.

The bearing housing 22 includes a corresponding locking base 94 for engaging with the locking plate 88. Preferably, the locking base 94 is integral to the bearing housing 22, including five outcroppings 96 equally spaced in a circular array for abutting the periphery of the locking plate 88 as illustrated in FIG. 3. Each pair of adjacent outcroppings 96 defining a slot 98 there between for receiving the tongue 90. Therefore, the locking base 94 includes five slots 98 for positioning the locking plate 88 in five different orientations. The locking plate 88 and corresponding locking base 94 are designed to accommodate any angular position of the hexagonal head 44 thereby maintaining the pin 40 in a relative axial position with the sleeve 42.

Moreover, the locking means 86 can further comprise a spring-loaded retaining clip 100 adapted to be received in a corresponding circumferential groove defined in the bearing housing 22 to axially retain the locking plate 88 as depicted in this exemplary embodiment. The retaining clip 100 prevents the pin 40 from freely moving axially in the forward direction by locking the locking plate 88 to the locking base 94. For instance, in a case where the pin 40 is completely unscrewed from the sleeve 42, the retaining clip 100 prevents the pin 40 and locking plate 88 from falling forward into the cavity 80 of the bearing housing 22.

FIGS. 2 and 3 show the retaining clip 100 engaged with the locking base 94 adjacent the locking plate 88. More specifically, the outcroppings 96 have lips 102 that extend radially inward against which the retaining clip 100 abuts when positioned. The retaining clip 100 is preferably annular with an open end 104 providing flexibility. To install the retaining clip 100 it is first compressed, then positioned adjacent the locking plate 88 and released so as to engage behind the lips 102 of the outcroppings 96.

Therefore, the locking means 86 of the trigger 28 exemplified in this embodiment limit the freedom of motion of the pin 40 rotationally by way of a locking plate 88 and base 94 and a retaining clip 100 respectively.

Now referring back to FIG. 2, the method of adjusting the triggering clearance 38 entails first mounting the trigger 28 having first and second "telescopically" related portions for axial displacement when triggered. In this exemplified embodiment the first and second portions are the pin 40 and sleeve 42, however it should be clear that alternative embodiments exist without departing from the scope or depth of the invention. The sleeve 42 and the pin 40 are mounted to the support 32 for axial movement relative thereto in response to a pushing action of the low pressure shaft bolt 24. Second, the method entails adjusting the triggering clearance 38 by selectively fixing a relative axial adjustive position between the first telescopically related portions, namely the sleeve 42 and the pin 40. The sleeve remains in its set position relative to lever 30 and the pin 40 is screwed further into the sleeve 42 or partly unscrewed therefrom to vary the effective length of the trigger 28 and, thus, adjust the gap 38. The pin 40 is rotated counter clockwise or clockwise by engaging a tool with the hexagonal head 44 while the sleeve 42 is locked against rotation.

To adjust the relative axial position between the pin 40 and the sleeve 42, the pin 40 can be screwed or unscrewed until a position is selected and fixed. The relative axial position can be fixed by a number of locking means 86 as aforementioned. For example, the locking plate 88 can be installed along with the retaining clip 100.

The method of adjusting the triggering clearance 38 above-described is advantageous over prior art methods as the triggering clearance 38 can be adjusted on the assembly line when the turbine engine 10 is being assembled. Due to the fact that the triggering clearance 38 varies depending on the range of the tolerance stack-up on the engine, it is preferable to be able to quickly and easily adjust the triggering clearance 38 on the assembly line. The elimination of the time required to grind the pin to the required length represents a major cost saving.

Figure 4:
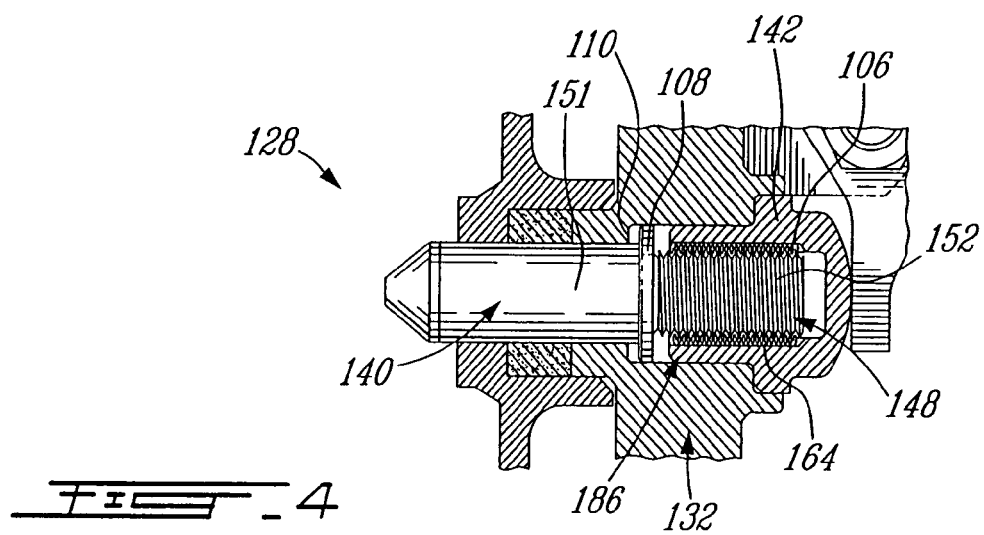
FIG. 4 is an axial cross-sectional view of a trigger in accordance with another embodiment of the present invention.

FIG. 4 illustrates another embodiment of the present invention. The reference numerals used for various elements in this embodiment correspond to the reference numerals utilized in the preferred embodiment but have been raised by 100.

The trigger 128 illustrated in FIG. 4 comprises locking means 186 differing from the preferred embodiment above-described. A helical coil 106 is mounted between the external threads 152 of the pin 140 and the internal threads 164 of the sleeve 142 to provide substantial resistance when screwing or unscrewing the pin 140; therefore, limiting the rotational freedom of motion of the pin 140. For example, up to 14 pounds of torque can be required to turn the pin 140 with the helical coil 106 insert installed.

Notably, a similar outcome can be attained without the use of the helical coil 106 but with a deformed sleeve 242 that is slightly flattened on opposing sides rather than perfectly annular. Thus, the shape of the deformed sleeve 242 renders the task of screwing and unscrewing the pin 240 arduous.

Also, the pin 140 comprises a flange 108 extending radially from the central portion 151 adjacent the threaded portion 148 thereof. The flange 108 is adapted to abut surface 110 of the support 132 for limiting forward axial freedom of motion of the pin 140.

Figure 5:
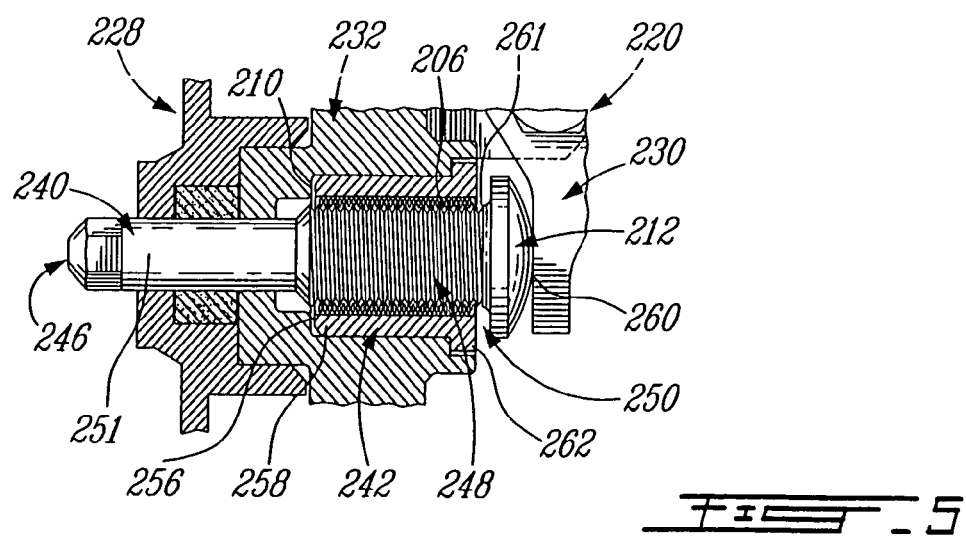
FIG. 5 is an axial cross-sectional view of a trigger in accordance with yet another embodiment of the present invention.

FIG. 5 illustrates yet another embodiment of the present invention. The reference numerals used for various elements in this embodiment correspond to the reference numerals utilized in the preferred embodiment but have been raised by 200.

The trigger 228 illustrated in FIG. 5 comprises a threaded portion 248 that is larger in diameter than the central portion 251. Such a configuration limits the axial freedom of motion of the pin 240 as the threaded portion 248 is adapted to abut surface 210 of the support 232. In this exemplary embodiment the rotational freedom of motion of the pin 240 relative to the sleeve 242 is restricted by a helical coil insert 206 as in the embodiment depicted in FIG. 4.

Furthermore, it can be seen that the sleeve 242 comprises a first axial opening 256 at an upstream end 258 thereof and a second axial opening 261 at a downstream end 262 thereof. The abutting surface 260 is provided by a pin cap 212 that is preferably integral to the pin 240 rather than by the sleeve 242. The pin cap 212 abuts the lever 230 of the fuel shut-off mechanism 220 for actuation thereof when the trigger 228 is triggered. Thus, in this particular embodiment the central portion 251 of the pin 240 requires a diameter less than or equal to the diameter of the threaded portion 248 to ensure that the sleeve 242 can be mounted from the upstream end 246 of the pin 240. The pin cap 212 is larger than opening 261 to prevent pin 240 from falling into the bearing cavity.

Notably, in still another embodiment of the present invention, the pin cap 212 can be provided as a separate part to the pin 240 to allow the sleeve 242 to be mounted from the downstream end 250 of the pin in the case where it was necessary to have a central portion 251 with a diameter larger than the diameter of the threaded portion 248. The pin cap 212 can be welded or brazed in place once the sleeve 242 is threadedly engaged with the pin 240.

The trigger 28 embodied herein enables the pre-assembled turbine exhaust case (TEC) comprising the fuel shut-off mechanism, the safety cable and the engine rear cone to be quickly assembled to the rest of the turbine engine. The trigger 28 is designed to facilitate manipulation and adjustment thereof.

The above description is meant to be exemplary only, and one skilled in the art will recognize that changes may be made to the embodiments described without department from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of adjusting a triggering clearance of a gas turbine engine fuel shut-off mechanism including a safety fuel shut-off lever, the method comprising the steps of:
   a) mounting a trigger to a stationary structure of the gas turbine engine, the trigger having first and second engaged members for joint axial displacement when triggered, the trigger having an adjustable length extending from a first end to a second opposed end, the first and second ends being respectively provided by said first and second members, wherein mounting the trigger comprises axially abutting the second member against a front reference surface on the fuel shut-off lever and locking the second member against rotation relative to the stationary structure while allowing rearward axial movement of the second member together with the first member relative to the stationary structure, and then
   b) adjusting the triggering clearance by varying the length of the trigger, and wherein varying the length of the trigger includes selectively fixing an axial adjustive position between the first and second members.

2. The method of claim 1, wherein step b) comprises moving the first member axially relative to the second member so as to increase or reduce the distance between said first and second ends, and securing the axial adjustive position.

3. The method of claim 1, wherein step b) comprises one of screwing and unscrewing the first member relative to the second member.

4. The method of claim 2, wherein moving the first member relative to the second member comprises one of screwing and unscrewing the first member.

5. The method of claim 4, wherein securing the axial adjustive position comprises limiting the axial displacement of the trigger.

6. The method of claim 4, wherein the step of securing the axial adjustive position comprises locking the first member against further rotation relative to the second member.

7. The method of claim 6, wherein the locking step comprises mounting a locking plate in an angularly locked relationship on said first member, and restraining said locking plate against angular movement, the restraining step comprising engaging the locking plate in a selected one of a plurality of predetermined angularly offset locking positions on the first member.

8. The method of claim 7, further comprising the step of preventing axial withdrawal of the locking plate from said first member once the locking plate has been locked against angular movement.

9. A gas turbine engine safety fuel shut-off mechanism for actuating a fuel control unit comprising a fuel shut-off lever to stop a flow of fuel in the event of a rotor shaft rupture, the mechanism comprising a stationary support, a trigger mounted to the support and spaced from a rotor by a triggering clearance, the trigger having an adjustable length defined by first and second members engaged in a relative axial position, the relative axial position between the first and second members being adjustable to adjust the triggering clearance, the second member having an end axially abutting a front reference surface on the fuel shut-off lever, the first and second members being axially jointly displaceable when triggered by the rotor to actuate the fuel control unit, the second member being retained against rotational movement by the stationary support while being axially movable with respect thereto together with the first member.

10. The gas turbine engine safety fuel shut-off mechanism of claim 9, wherein the first member is threadedly engaged to the second member.

11. The gas turbine engine safety fuel shut-off mechanism of claim 9, wherein the first member is externally threaded and the second member in internally threaded.

12. The gas turbine engine safety fuel shut-off mechanism of claim 9, wherein the first member has a head adapted to be gripped by a tool for being screwed or unscrewed.

13. The gas turbine engine safety fuel shut-off mechanism of claim 9, wherein the first member is releasably secured in the relative axial adjustive position to the second member by locking means.

14. The gas turbine engine safety fuel shut-off mechanism of claim 13, wherein the locking means comprise a locking plate for preventing rotational movement of the first member relative to the second member, said locking plate being locked against angular movement relative to said first member and including a locking tab selectively engageable in a plurality of locking slots circumferentially distributed about the first member, the locking slots being defined in a surrounding member which is fixed relative to the first member.

15. The gas turbine engine safety fuel shut-off mechanism of claim 14, wherein the locking means further comprise a retaining clip for retaining the axial position of the locking plate.

16. The gas turbine engine safety fuel shut-off mechanism of claim 13, wherein the locking means comprise a helical coil threaded between the first and the second member to create a resistance when the first member is screwed or unscrewed relative to the second member.

17. The gas turbine engine safety fuel shut-off mechanism of claim 13, wherein the locking means comprise a deformation of the second member to create a resistance when the first member is screwed or unscrewed relative to the second member.

18. The gas turbine engine safety fuel shut-off mechanism of claim 9, wherein a third member is interposed between the first and second members to provide a resisted adjustment.

19. The fuel shut-off mechanism defined in claim 9, wherein the first and second members are threadably engaged, and wherein locking means are provided for securing the first and second member in a selected relative axial position.

20. The method defined in claim 7, wherein the locking plate has a locking tab selectively engageable against rotational movement in a selected one of a plurality of circumferentially distributed tab receiving slots defined in a fixed surrounding part, and wherein the method comprises engaging said locking tab in one of said tab receiving slots.

\* \* \* \* \*